United States Patent
Garcés Erice et al.

(10) Patent No.: US 11,500,849 B2
(45) Date of Patent: Nov. 15, 2022

(54) UNIVERSAL STREAMING CHANGE DATA CAPTURE

(71) Applicant: INTERNATIONAL BUSINESS MACHINES CORPORATION, Armonk, NY (US)

(72) Inventors: Luis Garcés Erice, Rueschlikon (CH); John G. Rooney, Zurich (CH); Peter Urbanetz, Au (CH); Daniel Nikolaus Bauer, Birmensdorf (CH)

(73) Assignee: International Business Machines Corporation, Armonk, NY (US)

(*) Notice: Subject to any disclaimer, the term of this patent is extended or adjusted under 35 U.S.C. 154(b) by 184 days.

(21) Appl. No.: 16/700,043

(22) Filed: Dec. 2, 2019

(65) Prior Publication Data
US 2021/0165777 A1    Jun. 3, 2021

(51) Int. Cl.
*G06F 16/22* (2019.01)
*G06F 16/23* (2019.01)
*G06F 16/2455* (2019.01)

(52) U.S. Cl.
CPC ...... *G06F 16/2365* (2019.01); *G06F 16/2282* (2019.01); *G06F 16/24568* (2019.01)

(58) Field of Classification Search
None
See application file for complete search history.

(56) References Cited

U.S. PATENT DOCUMENTS

| | | | |
|---|---|---|---|
| 8,543,539 B2 | 9/2013 | Ahluwalia | |
| 8,595,188 B2 | 11/2013 | Gruhl | |
| 2003/0084038 A1* | 5/2003 | Balogh | G06F 9/546 |
| 2010/0125545 A1* | 5/2010 | Navas | G06F 16/2255 |
| | | | 707/602 |
| 2014/0280165 A1* | 9/2014 | Jain | G06F 16/162 |
| | | | 707/738 |
| 2015/0019484 A1* | 1/2015 | Mack | G06F 16/2365 |
| | | | 707/622 |
| 2016/0078068 A1* | 3/2016 | Agrawal | G06F 16/215 |
| | | | 707/692 |
| 2017/0324829 A1* | 11/2017 | Voronkov | H04L 67/5681 |
| 2018/0157865 A1* | 6/2018 | Beals | G06F 8/60 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Wilson Lee
(74) *Attorney, Agent, or Firm* — Nicholas A. Welling (57) ABSTRACT

A computer-implemented method for transferring changes made to data from a data source to a data destination may be provided. The method involves using a message broker with streaming channels for transferring data changes from a data source to a data consumer. To determine if data has changed, a portion of data labeled with a key is sent through a hash function. A hash value with the corresponding key that has already been sent to the data consumer is retrieved from a streaming channel and compared to the newly created hash value. If the newly created hash value is different the data is sent to data consumers by the message broker via one streaming channel, while the new hash value is stored in the other streaming channel.

15 Claims, 7 Drawing Sheets

(56) References Cited

U.S. PATENT DOCUMENTS

2019/0102418 A1    4/2019  Vasudevan
2021/0044499 A1*   2/2021  Snyder .................. H04L 43/091
2021/0067344 A1*   3/2021  Drake .................... H04L 9/3247

OTHER PUBLICATIONS

IBM, "Keep data flowing with unrivaled reliability", IBM MQ, downloaded from the Internet on Aug. 5, 2021, 12 pages, <https://www.ibm.com/products/mq>.

Kafka, "Apache Kafka", downloaded from the Internet on Aug. 5, 2021, 4 pages, <https://kafka.apache.org/>.

Tridgell et al., "The rsync algorithm", TR-CS-96-05, Jun. 1996, The Australian National University, Joint Computer Science Technical Report Series, Department of Computer Science Faculty of Engineering and Information Technology, Computer Sciences Laboratory Research School of Information Sciences and Engineering, Canberra ACT 0200, Australia, 8 pages.

* cited by examiner

UNIVERSAL STREAMING CHANGE DATA CAPTURE

BACKGROUND

The invention relates generally to transmitting data updates, and more specifically, to transferring changes made to data from a data source to a data destination.

The growth of data volumes in enterprises as well as in private environments is inevitable. The availability of elastic computing resources from cloud computing centers has created a constantly growing need for efficient forms of data transmission and replication. The resources to process data can be purchased, but the data to be processed is generated elsewhere, either outside the cloud computing system or on separate parts of networked resources on the Internet. Inside a company, data generated or purchased by one team may be required by another team for different purposes. Messaging systems, such as Apache's Kafka or IBM's MQ broker decouple the producers of data from consumers of data and allow data to be transmitted to a large number of recipients. Data producers send data to a broker, and consumers receive data from the broker. The data producer and data consumer do not communicate directly with each other.

As storage becomes less expensive and faster, data generation increases accordingly. This makes it more difficult to transmit data in bulk to other interested parties. Moreover, data changes constantly and the updated data needs to be refreshed, in real-time or periodically, for processes to be updated or decisions to be made. Change Data Capture (CDC) may be an efficient method to transfer changes made to structured data from a source (typically a database) to a destination, wherein the data is replicated for later processing.

SUMMARY

According to one aspect of the present invention, a computer-implemented method for transferring changes made to data on a data source to a data consumer may be provided. The method comprising retrieving a first hash value, associated with a key, from a first streaming channel. The computer-implemented method further comprising retrieving a portion of data, associated with the key, from a data source. The computer-implemented method further comprising creating a second hash value based on executing a hash function on the portion of data. The computer-implemented method further comprising comparing the first hash value to the second hash value. The computer-implemented method further comprising, where if the first hash value is not equal to the second hash value, executing actions comprising, transmitting the key and the portion of data to a data consumer on a second streaming channel, and updating the first streaming channel with the key and the second hash value.

According to another aspect of the present invention, a computer program product for transferring changes made to data from a data source to a data destination may be provided. The computer program product may comprise one or more computer readable storage media and program instructions stored on the one or more computer readable storage media, the program instructions may include instructions to retrieve a first hash value, associated with a key, from a first streaming channel. The program instructions further include instructions to retrieve a portion of data, associated with the key from a data source. The program instructions further include instructions to create a second hash value based on executing a hash function on the portion of data. The program instructions further include instructions to compare the first hash value to the second hash value. The program instructions further includes instructions where if the first hash value is not equal to the second hash value, execute actions comprising, transmitting the key and the portion of data to a data consumer on a second streaming channel and updating the first streaming channel with the key and the second hash value.

According to another aspect of the present invention, a computer system for transferring changes made to data from a data source to a data destination may be provided. The system may comprise one or more computer processors, one or more computer readable storage media, and computer program instructions. The computer program instructions being stored on the one or more computer readable storage media for execution by the one or more computer processors, and the computer program instructions including instructions to retrieve a first hash value, associated with a key, from a first streaming channel. The program instructions further include instructions to retrieve a portion of data, associated with the key from a data source. The program instructions further include instructions to create a second hash value based on executing a hash function on the portion of data. The program instructions further include instructions to compare the first hash value to the second hash value. The program instructions further includes instructions, where if the first hash value is not equal to the second hash value, execute actions comprising, transmitting the key and the portion of data to a data consumer on a second streaming channel and updating the first streaming channel with the key and the second hash value.

DETAILED DESCRIPTION

It should be noted that embodiments of the present invention are described with reference to different subject-matters. In particular, some embodiments are described with reference to method type claims. However, a person of ordinary skill in the art will gather from the above and the following description that, unless otherwise noted, in addition to any combination of features belonging to one type of subject-matter, any combination of features relating to different subject-matters, in particular, features of the method type claims, systems claims, and computer product claims are considered as to be disclosed within this document.

The aspects defined above, and further aspects of the present invention, are apparent from the examples of embodiments to be described hereinafter and are explained with reference to the examples of embodiments, but to which the invention is not limited.

Embodiments of an invention for transferring changes made to data from a data source to a data destination may offer multiple advantages, contributions and technical effects such as, but not limited to, a modern infrastructure for consistency of data across different systems, potentially in different locations, may be enabled efficiently; between the data source and the data destination, no additional protocol may have to be implemented; the data destination systems may handle received data in an unchanged manner, e.g., they may have no information about the management, identification and transmission of original or changed data of the data source; the data source and the data destination may be completely decoupled for this form of data replication; and the system, responsible for identifying the data has changed, is the data producer side.

Additionally, state-of-the-art asynchronous communication and data transmission techniques may be used as messaging brokers or streaming systems. Hence, if for the data and a respective signature, e.g., in the form of a hash value of the data, different channels may be used on the streaming system, the data source related system may determine that changes to data having a specific, selected, unique key may have been made. Thus, also on the storage system for the data source, no additional provisions may have to be made. The data may be stored as usual. Embodiments of the invention may represent a minimally invasive approach for ensuring that changes to data may be replicated consistently. Accordingly, existing systems may be enhanced with the herein proposed concept without the requirement to change anything on the existing data sources and data destinations.

There may be very little overhead as a result of embodiments of the present invention because the generated hash values relating to the original data are small amounts of data. Furthermore, no complex transaction logs must be maintained for the original data.

A further advantage of embodiments of the present invention may be seen in the fact that it may be applied to any kind of information, in any storage format such as, but not limited to, structured data, semi-structured data, and unstructured data, in any type of storage system from a flat file system via relational databases to object databases and, e.g., NoSQL databases and knowledge management systems. It may only be required that data may be identified by a unique key.

In the following, additional embodiments, applicable to the method, computer program product as well as to the related system, will be described.

In embodiments of the present invention, the streaming techniques may be executed by a message broker. Such message brokers, or streaming systems, provide access to different dedicated transmission channels so that data and signatures, e.g., hash values, and other forms of hash values may be transmitted independently and reliably. One such message broker or streaming system, in a specific embodiment, a Kafka system, from the Apache Foundation, may be used such that the streaming techniques are based on the Kafka system. A Kafka system may denote an open-source stream-processing software platform. The purpose is to provide a unified, high-throughput, low-latency platform for handling real-time data feeds. A Kafka system may connect to external systems, e.g., for data import/export, via Kafka Connect, and provide Kafka Streams, a Java-based stream processing library. In the concepts proposed herein, Kafka streams are used as a data channel and a signature channel. Alternatively, an IBM MQ Series message queue system (i.e., message broker) or any other message broker system may be used.

According to another embodiment of the present invention, the data may be structured data in the form of records. The records may typically be stored in a database which may be a record-oriented database or a columnar database. The data may also be stored in an in-memory database. The record lengths may be fixed length or variable length and each record may be identifiable by a unique key, e.g., a primary key. However, the proposed method may also work with any other way of storing data, as long as the data is identifiable and selectable by a unique key value. Thus, data in a file system may be structured data for the purpose of the concepts proposed herein.

According to another embodiment of the present invention, the data may be semi-structured data. One such example is data in the form of text comprising delimiters between data values, e.g., new line (NL) or carriage return (CR) may be seen as such semi-structured data. Every line, separated by an NL character may have to be identifiable by a unique key value or, every paragraph separated by a CR character may have to be identifiable by a unique key value. However, changes to any other semi-structured data may be reliably transmitted and updated on data consumer systems.

In another embodiment of the invention, the data may be unstructured data that may be divided into chunks of fixed length, wherein an offset value related to one of the chunks may be a portion of a key relating to a corresponding chunk. A typical chunk size may be 4 kilobytes (Kb), however, any other chunk size may also be used as part of the concept proposed herein.

Additionally, the offset of a specific chunk in the unstructured data may be used as a complete key if one channel of the message broker may be dedicated to this set of unstructured data. Hence, each unstructured data set may use its own data channel in the message broker.

According to an embodiment of the present invention, the method may also comprise determining a second hash value of the data. Specifically, the data in the data source for a selected key, according to a predefined schedule or based on a trigger event. This may result in a second hash value different than the first hash value for the selected key if the corresponding data have been changed after the determination of the first hash value. This task may be performed on a system, e.g., the producer, managing the data source or relating to the data storage system of the data source in one way or the another. The method may also comprise that all data that is replicated to other data receiver systems may undergo a determination of a second hash value, i.e., all keys may be addressed more or less regularly over time.

According to another embodiment of the present invention, the method may also comprise: upon determining, in particular, on the data producer or data source side, that the second hash value is different than the first hash value, transmitting the changed data relating to the selected key. This transmission from the data source to the data destination may be performed via the streaming techniques, i.e., the message queue system via the same channel over which the original data have been transmitted, i.e., the data channel. On the data receiver side, the data update may be performed as usual.

In another embodiment of the present invention, the method may also comprise requesting the hash value relating to a selected key from the second channel by a source system of the data. It may be determined that the first and the second hash value may be different indicating that the underlying data from which the hash values have been determined have been changed. Accordingly, the updated data may have to be transmitted to a destination system(s).

Embodiments of the present invention may be implemented together with virtually any type of computer, regardless of the platform, being suitable for storing and/or executing program code.

Figure 1:
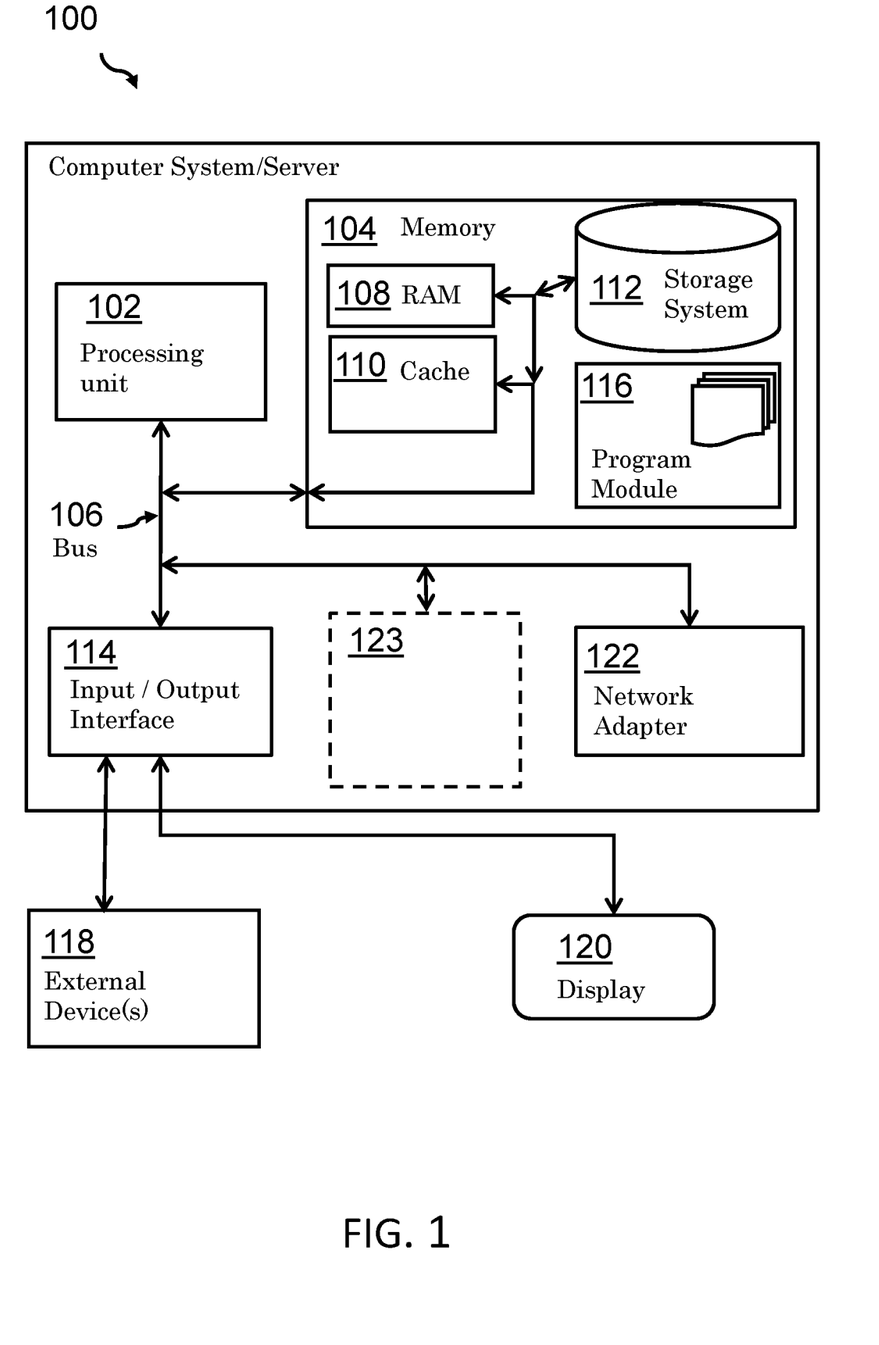
FIG. 1 is a block diagram depicting components of a computer, generally designated 100, suitable for operation of a universal streaming change data capture program in accordance with an embodiment of the present invention.

FIG. 1 shows, as an example, a computing system 100 suitable for executing program code related to the proposed method.

The computing system 100 is only one example of a suitable computer system and is not intended to suggest any limitation as to the scope of use or functionality of embodiments of the invention described herein, regardless, whether the computer system 100 is capable of being implemented and/or performing any of the functionality set forth hereinabove. In the computer system 100, there are components, which are operational with numerous other general purpose or special purpose computing system environments or configurations. Examples of well-known computing systems, environments, and/or configurations that may be suitable for use with computer system/server 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 100 may be described in the general context of computer system-executable instructions, such as program modules, being executed by a computer system 100. Generally, program modules may include routines, programs, objects, components, logic, data structures, and so on that perform particular tasks or implement particular abstract data types. Computer system/server 100 may be practiced in distributed cloud computing environments where tasks are performed by remote processing devices that are linked through a communications network. In a distributed cloud computing environment, program modules may be located in both, local and remote computer system storage media, including memory storage devices.

As shown in the FIG. 1, computer system/server 100 is shown in the form of a general-purpose computing device. The components of computer system/server 100 may include, but are not limited to, one or more processors or processing units 102, a system memory 104, and a bus 106 that couple various system components including system memory 104 to the processor 102. Bus 106 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 100 typically includes a variety of computer system readable media. Such media may be any available media that is accessible by computer system/server 100, and it includes both, volatile and non-volatile media, removable and non-removable media.

The system memory 104 may include computer system readable media in the form of volatile memory, such as random-access memory (RAM) 108 and/or cache memory 110. Computer system/server 100 may further include other removable/non-removable, volatile/non-volatile computer system storage media. By way of example only, a storage system 112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as, but not limited to, a CD-ROM, DVD-ROM or other optical media may be provided. In such instances, each can be connected to bus 106 by one or more data media interfaces. As will be further depicted and described below, memory 104 may include at least one program product having a set (e.g., at least one) of program modules that are configured to carry out the functions of embodiments of the invention.

The program/utility, having a set (at least one) of program modules 116, may be stored in memory 104 by way of example, and not limiting, as well as an operating system, one or more application programs, other program modules, and program data. Each of the operating systems, one or more application programs, other program modules, and program data or some combination thereof, may include an implementation of a networking environment. Program modules 116 generally carry out the functions and/or methodologies of embodiments of the invention, as described herein.

The computer system/server 100 may also communicate with one or more external devices 118 such as a keyboard, a pointing device, a display 120, etc.; one or more devices that enable a user to interact with computer system/server 100; and/or any devices (e.g., network card, modem, etc.) that enable computer system/server 100 to communicate with one or more other computing devices. Such communication can occur via Input/Output (I/O) interfaces 114. Still yet, computer system/server 100 may communicate with one or more networks such as a local area network (LAN), a general wide area network (WAN), and/or a public network (e.g., the Internet) via network adapter 122. As depicted, network adapter 122 may communicate with the other components of the computer system/server 100 via bus 106. It should be understood that, although not shown, other hardware and/or software components could be used in conjunction with computer system/server 100. Examples, include, but are not limited to: microcode, device drivers, redundant processing units, external disk drive arrays, RAID systems, tape drives, and data archival storage systems, etc.

Embodiments of the invention may be implemented together with virtually any type of computer, regardless of the platform being suitable for storing and/or executing program code. FIG. 1 shows, as an example, a computing system 100 suitable for executing program code related to the proposed method.

The computing system 100 is only one example of a suitable computer system and is not intended to suggest any limitation as to the scope of use or functionality of embodiments of the invention described herein, regardless, whether the computer system 100 is capable of being implemented and/or performing any of the functionality set forth hereinabove. In the computer system 100, there are components, which are operational with numerous other general purpose or special purpose computing system environments or configurations. Examples of well-known computing systems, environments, and/or configurations that may be suitable for use with computer system/server 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 100 may be described in the general context of computer system-executable instructions, such as program modules, being executed by a computer system 100. Generally, program modules may include routines, programs, objects, components, logic, data structures, and so on that perform particular tasks or implement particular abstract data types. Computer system/server 100 may be practiced in distributed cloud computing environments where tasks are performed by remote processing devices that are linked through a communications network. In a distributed cloud computing environment, program modules may be located in both, local and remote computer system storage media, including memory storage devices.

Additionally, the data transferring system 123 for transferring changes made to data from a data source to a data destination may be attached to the bus system 106 or in the alternative may be run via the program module 116.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of embodiments of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

Figure 2:
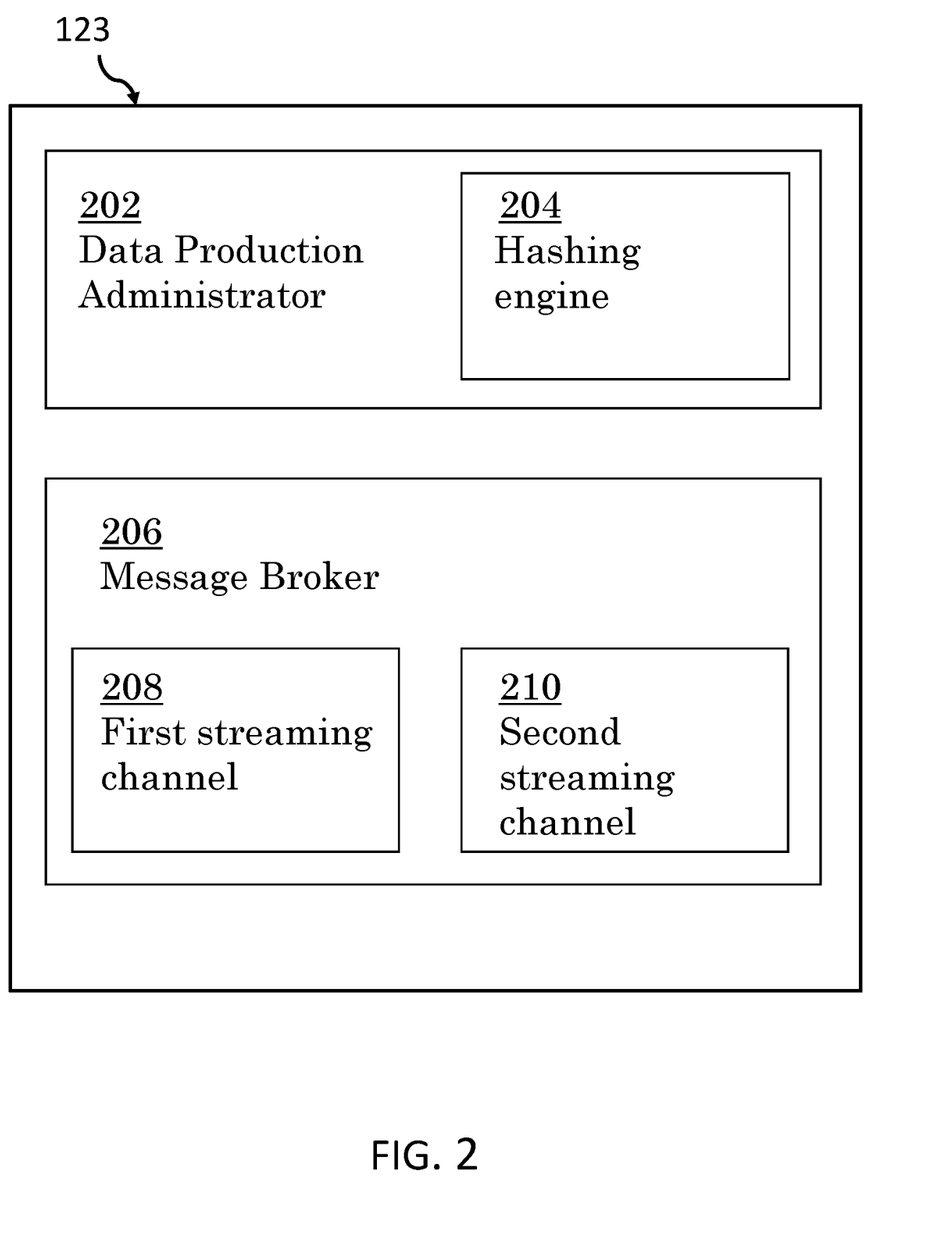
FIG. 2 is a block diagram of universal streaming change data capture program, in accordance with an embodiment of the present invention.

FIG. 2 shows an embodiment of the change transmission program 123 for transferring changes made to data from a data source to a data destination. Change transmission program 123 comprises a data production administrator 202. Data production administrator 202 provides the capability to transfer data from the data source to the message broker 206. Data production administrator 202 also provides the capability to compare the hash values retrieved from the first streaming channel 208 to the hash values generated from the data retrieved from a data source 402 (shown in FIG. 4). The data from data source 402 may be in any form, i.e., as structured data records-wise in a database (row-oriented of columnar), as semi-structured data or, also as unstructured data. The data can be identified by a corresponding key, e.g., by a primary key.

Additionally, change transmission program 123 may house hashing engine 204. Hashing engine 204 provides the capability to apply a hash function to a particular set of data provided by a data source 402 that results in a hash value for that data. The term hash value denotes a result of a hash function applied to a specific set of data. The hash function may be used to map data of arbitrary size to fixed-sized values. The values returned by a hash function are called hash values or digests. Also contained in change transmission program 123 is message broker 206. Message broker 206 is the intermediary between the data source 402 and data consumer 408, 410, or 412 and allows for communication between the two. Contained in message broker 206 is first streaming channel 208 and second streaming channel 210. First streaming channel 208, i.e., signature channel, may receive the hash values produced by the hashing engine 204, wherein the hash value is identifiable with the corresponding key of the data. Second streaming channel 210, i.e., data channel, may receive data from the data source that is identifiable with a corresponding key. A streaming channel 208, 210 may be a communication path in a message broker 206 system or message queuing system using streaming techniques. A channel may receive and store messages which may be transmitted by the broker system on an output side of the broker system. This may keep a data source and a data destination separated from each other; however, at the same time the broker is instrumental in transmitting data from the data source to the data destination. Streaming techniques may be a sequence of digitally encoded coherent signals (packets of data or data packets) used to transmit or receive information that is in the process of being transmitted. A corresponding data stream is a set of extracted information from a data provider, i.e., a data source.

It may be noted that the first streaming channel 208 and the second streaming channel 210 may be the same, i.e., adapted to receive the transmitted data items as well as the related hash values, both being identifiable by the same key. Additionally, the transmitted data items and transmitted hash values may be retrieved independently of each other from the streaming channel.

Figure 3:
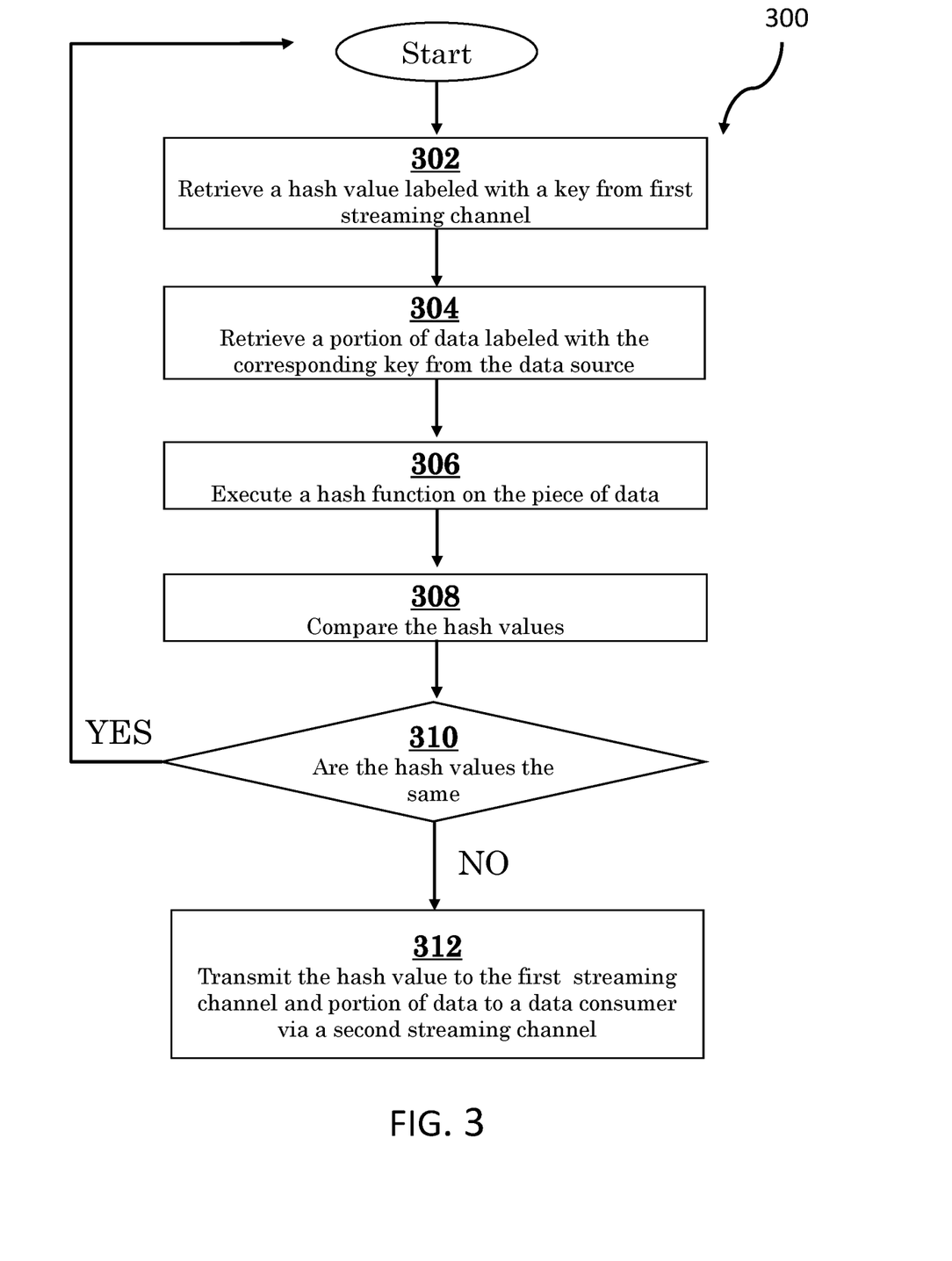
FIG. 3 is a flow chart diagram depicting a computer-implemented method for transferring changes made to data from a data source to a data destination, in accordance with an embodiment of the present invention.

FIG. 3 is a flow chart diagram depicting the operational steps of an embodiment of a computer-implemented method for transferring changes made to data from a data source to a data destination 300. At step 302, retrieve a hash value 422, 424, or 426 labeled with a key from the first streaming channel 208. Next at step 304, retrieve a portion of data 414, 416, or 418 from a data source 402 labeled with the corresponding key. Next at step 306, execute a hash function at the hash engine 210 on the piece of data 414, 416, 418, or 420. Next at step 308, Compare the hash value returned from the hash function to the hash value retrieved from the first streaming channel 208 at data production administrator 202. Next, at decision tree 310 determine if the hash values are the same. If the hash values are the same, then return to the start. If the hash values are not the same continue to the step 312. Next at step 312, transmit the new hash value corresponding to the new/changed portion of data from the data source 402 to the first streaming channel 208. Additionally, transfer the new/changed portion of data to a data consumer via a second streaming channel 210.

Figure 4:
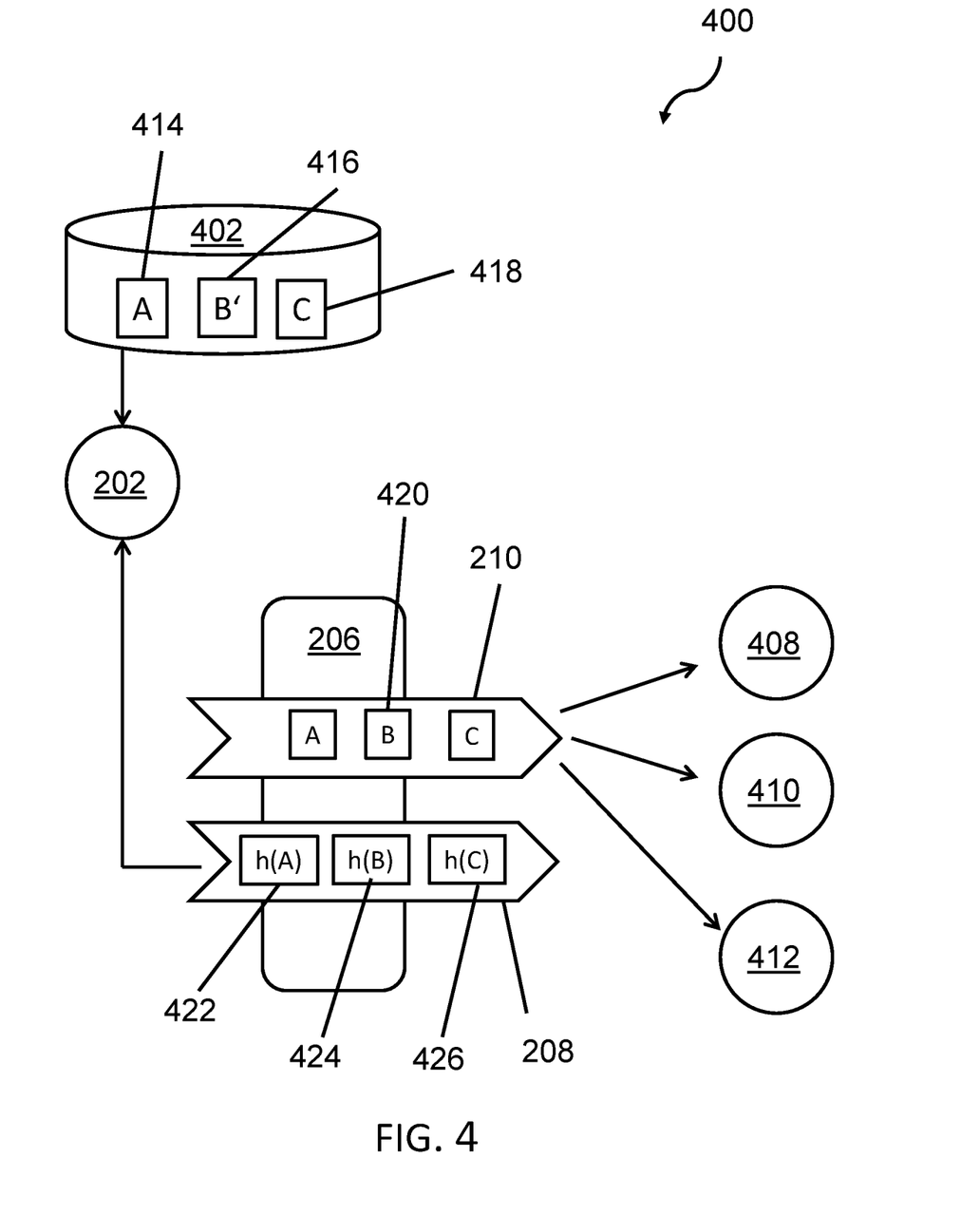
FIG. 4 is a block diagram of a transmission of data via a message broker, in accordance with an embodiment of the present invention.

FIG. 4 shows a block diagram 400 of an embodiment of a transmission of data via a message broker. The data source 402 comprises the data items A 414, B' 416, and C 418. The data items 414, 416, 418 have been transmitted via the message queuing system or broker 206, in particular, via the second streaming channel 210, to a least one of the data destinations 408, 410, 412. In addition to the data items A 414, B' 416, and C 418, the broker 206 also receives the respective hash values h(A) 422, h(B) 424, h(C) 426 via a first streaming channel 208, created by the hashing engine 204. The hash values are transmitted to the first streaming channel 208. However, the hash values do not need to be transferred to the data destinations.

If data item B, 420 referred to by key $k_b$ is changed, indicated by symbol B' 416, the hash value h(B') 502 (see FIG. 5) is different than the original hash value h(B) 424; thus, h(B') 502≠h(B) 424. The hash value of the original data item B 420 can be retrieved from the broker system 206 via key $k_2$ at any time.

If it is determined that a current hash value and a retrieved value (retrieved from the broker via the key) are different, in this example: h(B')≠h(B), the new, updated data item B' 416 is transmitted via the broker system 206 to the data destination(s).

For this, on the data producer side the data are read periodically and/or in particular upon a triggering event from the data source as latest version of hash value for each k from the signature channel. An example of a triggering event might be the cycling on of a data consumer or an error coming from a data consumer. For each piece of data i, where the hash value of the data h(i) does not correspond to the hash value and the signatures stream, the data is sent as the latest version to the data stream with its corresponding key $k_i$, and the new hash value is stored as the latest version for the same key in the first streaming channel 208. If the hash value of the data of the original source corresponds to the hash value of the latest version in the signatures stream, the data is not sent. If the data does not exist in the original data source anymore, a non-operation for the key k is sent with a signature of "0".

Figure 5:
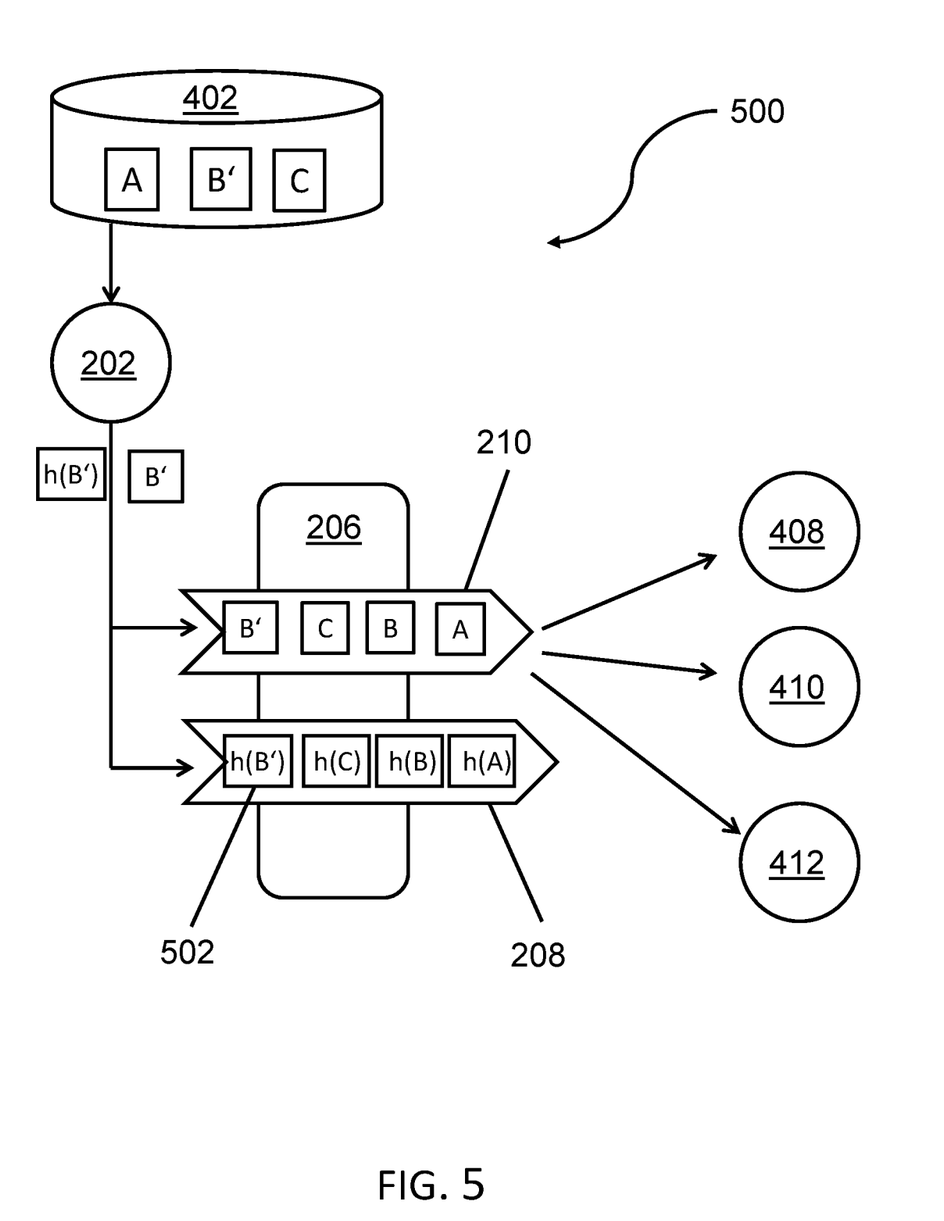
FIG. 5 is a block diagram of a transmission of changes of data via a message broker, in accordance with an embodiment of the present invention.

FIG. 5 shows a block diagram 500 of an embodiment of a transmission of changes of data via the message broker 206. As mentioned above, data item B 420 has been modified (B' 416) if compared to the original data item B 420. The data production administrator 202, sends the hash value h(B') 502 to the second streaming channel 210 which now also includes the hash value h(B') 502 for future comparisons. Additionally, besides the data items A 414 and C 418, now data item B'416 is stored in the second streaming channel 210, replacing data item B 420, and can be transmitted to the data destinations 408, 410, and/or 412 (if required, e.g., as subscribed).

It should also be appreciated that any type of data may be replicated from data sources to data destinations. This applies for structured data that may not have a primary key. The primary key is the $k_i$ that identifies each record i in a table of a database. If the table lacks a primary key, it may be useful to create a view for that table assigning each record in the table a monotonically increasing number. This number is then the key $k_i$ identifying each record i.

In the same way, also semi-structured data may be replicated. Delimiters in the stream of semi-structured data may be used to separate data items from each other. For example, NL or CR characters can separate paragraphs in a document; JavaScript Object notation (JSON) or Extensible Markup Language (XML) stanzas are separated by NL characters in log or data files.

For binary data with no or not easily defined structure, the binary data can be divided into chunks defined by an offset and a fixed size. So, for example, a file can be divided in 4096-byte blocks. The offset in the file becomes the $k_i$ for identifying each block i.

Depending on the rate of changes and the number of $k_i$, it may be more efficient to store the hash value of a range of n keys in the second streaming channel 210. Then, the hash value of the data corresponding to items i, ..., i+(n−1) is stored under the key $k_{i\ldots i+(n-1)}$. This allows a faster verification of changes and less data are read from the first streaming channel 208, but more data would need to be sent to the data stream if a change happens in any of the items i, ..., i(n−1). Key $k_{i\ldots i+(n-1)}$ may be constructed by any means from the keys in the range, such as concatenating the lower and upper values in the range, or other methods.

Consumers of data (408, 410, 412) need only read the latest version of the second streaming channel 210 to get the current state of the data. Optimizations on the broker and data may allow the elimination of all versions of data i, except the last one. Then, once a consumer system 408, 410, 412 has read all data from the second streaming channel 210, future connections to the broker 206 will make available only the data items that have changed in the stream.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
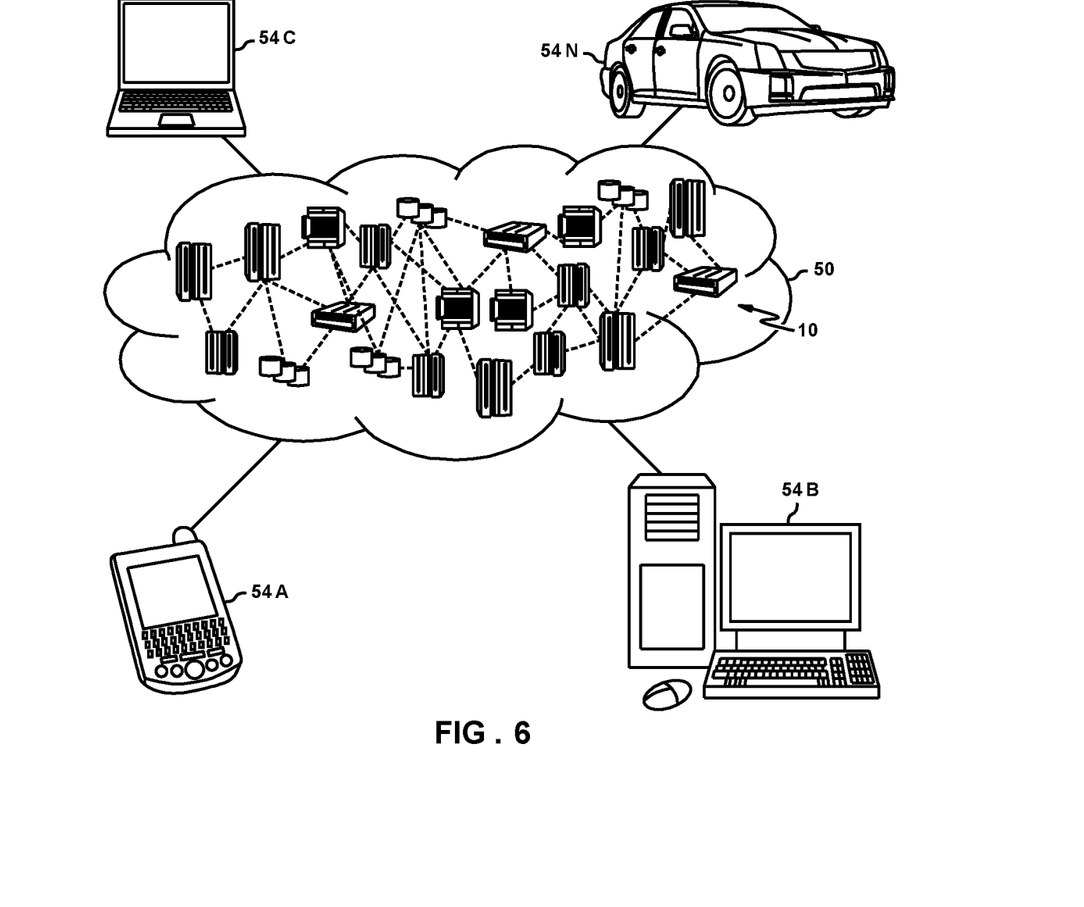
FIG. 6 is a block diagram depicting a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
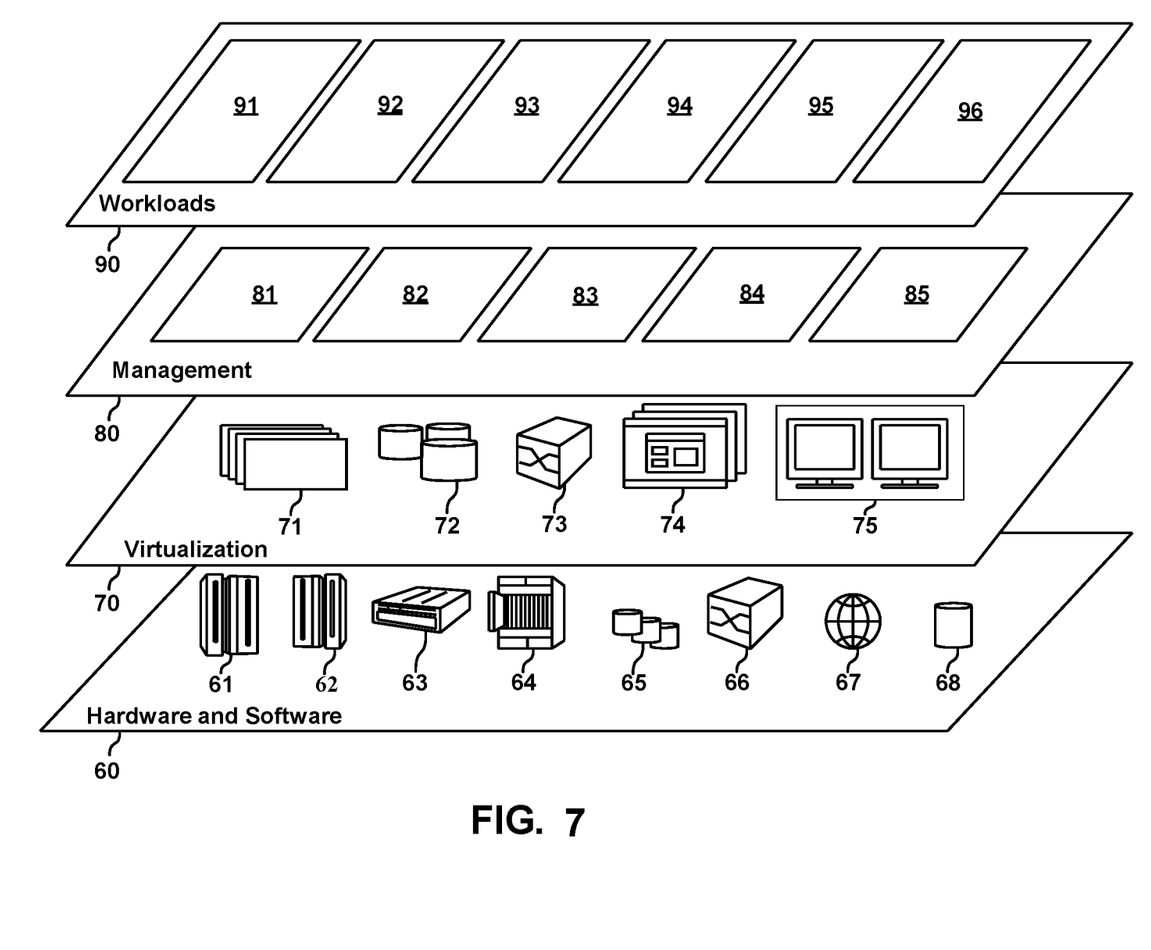
FIG. 7 is a block diagram depicting abstraction model layers, in accordance with an embodiment of the present invention.

Referring now to FIG. 7, a set of functional abstraction layers provided by cloud computing environment 50 (FIG. 1) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data change transmission program 96

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for transferring changes made to data on a data source to a data consumer, the computer-implemented method comprising:

retrieving, by one or more processors, a first hash value, associated with a key, from a first streaming channel;

retrieving, by the one or more processors, a portion of data, associated with the key, from a data source, wherein the portion of data is semi-structured data;

creating, by the one or more processors, a second hash value based on executing a hash function on the portion of data;

comparing, by the one or more processors, the first hash value to the second hash value; and responsive to the first hash value not being equal to the second hash value, executing, by the one or more processors, actions comprising:

transmitting the key and the portion of data to a data consumer on a second streaming channel; and updating the first streaming channel with the key and the second hash value.

2. The computer-implemented method of claim 1, wherein the comparing is based on a predefined schedule.

3. The computer-implemented method of claim 1, wherein the comparing is based on a triggering event.

4. The computer-implemented method of claim 1, wherein a message broker comprises the first streaming channel and the second streaming channel.

5. The computer-implemented method of claim 1, wherein the first streaming channel and the second streaming channel are based on a Kafka system.

6. A computer program product for transferring changes made to data from a data source to a data destination, the computer program product comprising one or more computer readable storage device and program instructions stored on the one or more computer readable storage device, the program instructions including instructions to:

retrieve a first hash value, associated with a key, from a first streaming channel;

retrieve a portion of data, associated with the key from a data source, wherein the portion of data is semi-structured data;

create a second hash value based on executing a hash function on the portion of data;

compare the first hash value to the second hash value; and responsive to the first hash value not being equal to the second hash value, execute actions comprising:

transmit the key and the portion of data to a data consumer on a second streaming channel; and update the first streaming channel with the key and the second hash value.

7. The computer program product of claim 6, wherein the compare is based on a predefined schedule.

8. The computer program product of claim 6, wherein the compare is based on a triggering event.

9. The computer program product of claim 6, wherein a message broker comprises the first streaming channel and the second streaming channel.

10. The computer program product of claim 6, wherein the first streaming and the second streaming channel are based on a Kafka system.

11. A computer system for transferring changes made to data from a data source to a data destination, comprising:

one or more computer processors;

one or more computer readable storage media;

computer program instructions;

the computer program instructions being stored on the one or more computer readable storage media for execution by the one or more computer processors; and the computer program instructions including instructions to:

retrieve a first hash value, associated with a key, from a first streaming channel;

retrieve a portion of data, associated with the key from a data source, wherein the portion of data is semi-structured data;

create a second hash value based on executing a hash function on the portion of data;

compare the first hash value to the second hash value; and responsive to the first hash value not being equal to the second hash value, execute actions comprising:

transmit the key and the portion of data to a data consumer on a second streaming channel; and update the first streaming channel with the key and the second hash value.

12. The computer system of claim 11, wherein the compare is based on a predefined schedule.

13. The computer system of claim 11, wherein the compare is based on a triggering event.

14. The computer system of claim 11, wherein a message broker comprises the first streaming channel and the second streaming channel.

15. The computer system of claim 11, wherein the first streaming channel and the second streaming channel are based on a Kafka system.

* * * * *